United States Patent [19]

Newbury

[11] Patent Number: 4,498,584
[45] Date of Patent: Feb. 12, 1985

[54] STACKABLE CONTAINER FOR USE IN A CONTAINERIZATION SYSTEM

[75] Inventor: Arthur D. Newbury, St. John's, Canada

[73] Assignee: Contrawl Limited, St. John's, Canada

[21] Appl. No.: 402,111

[22] Filed: Jul. 26, 1982

[51] Int. Cl.³ .................. B65D 21/02; B65D 90/02; B65D 90/06
[52] U.S. Cl. .................. 206/510; 206/504; 206/508; 220/23.4; 220/23.6; 220/444; 220/902
[58] Field of Search ............ 206/508, 509, 510, 504; 220/23.2, 23.4, 23.6, 444, 902

[56] References Cited

U.S. PATENT DOCUMENTS

| | | |
|---|---|---|
| Re. 29,683 | 6/1978 | Ocken .................. 220/23.4 |
| 2,448,373 | 8/1948 | Hurst . |
| 2,456,104 | 12/1948 | Anderson . |
| 2,490,609 | 12/1949 | Anderson . |
| 2,591,140 | 4/1952 | Dougherty et al. . |
| 2,760,676 | 8/1956 | Knieriem et al. . |
| 2,984,367 | 5/1961 | McIntyre . |
| 3,160,306 | 12/1964 | Smalley .................. 220/444 |
| 3,163,686 | 12/1964 | Dusel .................. 220/902 |
| 3,338,468 | 8/1967 | Wilson . |
| 3,366,273 | 1/1968 | Crocella et al. . |
| 3,447,716 | 6/1969 | Nesse . |
| 3,543,952 | 12/1970 | Young . |
| 3,823,972 | 7/1974 | Ramer .................. 220/23.4 |
| 3,946,881 | 3/1976 | Ludvigsen . |

FOREIGN PATENT DOCUMENTS

| | | |
|---|---|---|
| 499172 | 1/1954 | Canada . |
| 599910 | 12/1959 | Canada . |
| 714909 | 8/1965 | Canada . |
| 1057216 | 6/1979 | Canada . |
| 1259532 | 1/1968 | Fed. Rep. of Germany ..... 220/23.4 |
| 2815215 | 10/1979 | Fed. Rep. of Germany ..... 220/23.4 |
| 1306553 | 9/1962 | France .................. 206/510 |
| 2088047 | 1/1972 | France .................. 206/508 |
| 536318 | 12/1955 | Italy .................. 206/510 |
| 674883 | 12/1964 | Italy .................. 206/510 |
| 1202142 | 8/1970 | United Kingdom .................. 206/509 |
| 380554 | 12/1973 | U.S.S.R. .................. 206/509 |

Primary Examiner—George E. Lowrance
Attorney, Agent, or Firm—Barrigar & Oyen

[57] ABSTRACT

A method and apparatus for use in a system of containerized handling of fish onboard an ocean-going vessel. Fish are stored in closely stacking containers within the hold of the fishing vessel and are cyclically removed from within the hold to working positions on the deck of the vessel, where they are charged with fish and ice and returned to storage positions, by the cooperative use of an in-hold travelling hoist adapted to move a selected plurality of containers to and from chosen position within the hold compartment without disturbing other containers and an above-deck conveying system operable to convey the plurality of containers between a position inside the hold compartment directly below the hatchway through the deck overlying the hold compartment and a selected working position on the deck.

6 Claims, 23 Drawing Figures

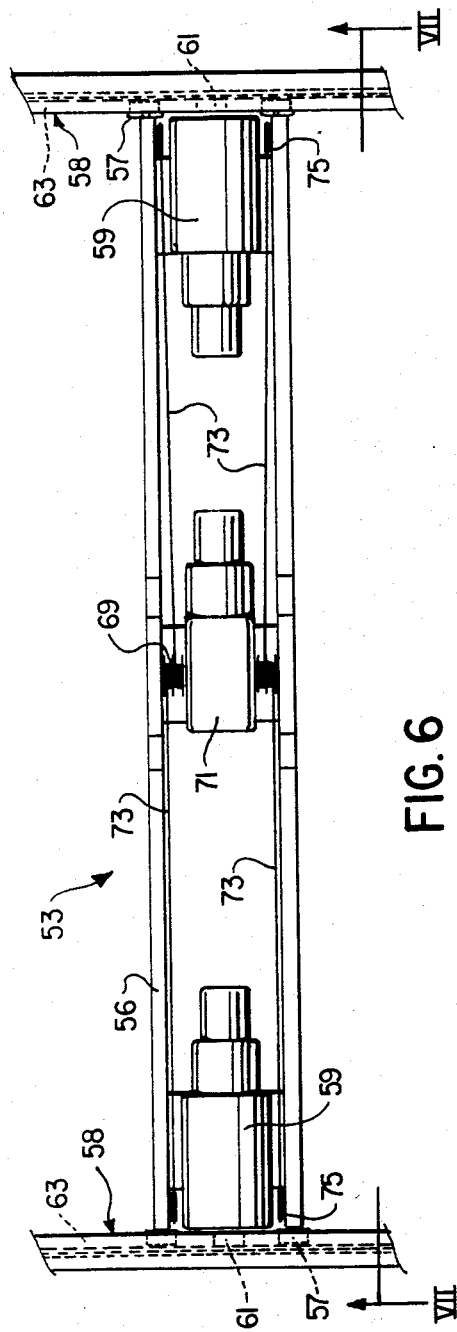
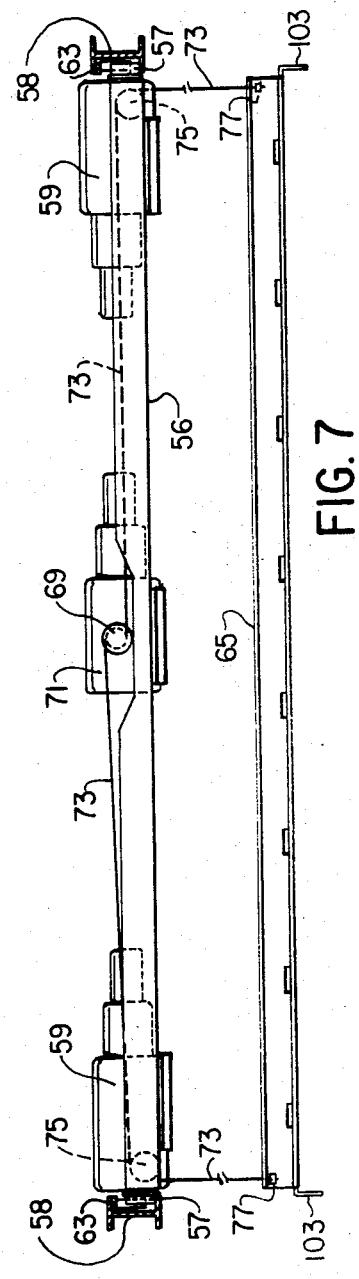
FIG. 6
FIG. 7

STACKABLE CONTAINER FOR USE IN A CONTAINERIZATION SYSTEM

BACKGROUND OF THE INVENTION

1. Field of the Invention

In the applicant's U.S. patent application Ser. No. 513,418, filed July 14, 1983 as a continuation-in-part of the present application, there is described an invention relating to method and apparatus for the transfer of objects, closely packed within an enclosure, between the interior of the enclosure and selected positions on the top deck of the enclosure. More particularly, the invention of the related application is directed to method and apparatus for transferring containers for the storage of fish in the hold of a vessel between the hold and the deck through a hatchway in the deck, and to a containerized fish handling system comprising suitable nesting containers, the transferring apparatus, and support and guiding structures within the hold of the vessel. The present invention relates to a stackable container of a novel construction especially suited to the storage and mechanical handling of fish aboard a fishing vessel at sea, using a system such as that described and claimed in U.S. application Ser. No. 513,418.

2. Description of the Prior Art

Known methods of holding fish onboard trawlers and discharging them from the hold are subject to a number of disadvantages.

One such method comprises the storage of fish below deck in large pens. Such pens are typically assembled during fishing operations by the fitting of corrugated aluminum boards (pen boards and shelving boards) into vertical stanchions permanently installed in the hold. Fish are subsequently removed by breaking down the pen boards and shelving and directing the loose fish to a conveyor system, air unloader or other impelling device to remove them from the hold. Storage of fish in pens utilizes space in the hold efficiently, but results in a deterioration of quality in the fish, arising in part from the considerable weight exerted on fish near the bottom of the pen by those above, and in part from physical damage that occurs during discharging.

Another method, which leads to the delivery to port of fish of a very high quality, employs the boxing of fish and ice in relatively small boxes (approximately 100 lb. capacity) and storage of such boxes by stacking them within the hold. However, boxing entails a high labour cost and the boxes employed and the manual procedures employed in their handling are volumetrically inefficient. Furthermore, neither boxing nor holding in pens lends itself to high rates of unloading fish from the hold.

Apparatus for handling fish containers to be stowed within the hold of a ship is disclosed in U.S. Pat. No. 2,448,373 (Hurst), which describes the gravity-controlled swinging of containers lowered into the hatchway towards either side of the hold by means of a system of ropes and pulleys. However, this system is not adapted to the rapid and volumetrically efficient storage and removal of the large number of relatively small, rigid containers required to ensure delivery of high quality fish to shore.

In accordance with the present invention which is the subject of continuation-in-part application Ser. No. 513,418, and which is described below to indicate the use of the stackable container of the present invention, there is provided a system of containerized fish handling which overcomes the deficiencies of prior systems of handling fish on board an ocean going vessel. This system allows the storage of fish in containers of sufficiently small interior depth to ensure delivery to port of a high quality product, while at the same time achieving high volumetric efficiency of fish storage within a hold compartment of a fishing vessel and high rates of discharge of containers from or transfer to a hold compartment.

According to applicant's containerized fish handling system, fish are stored in each hold compartment of the vessel in closely stacking, vertically mating containers. Each container is provided with extended side walls between which nests the container arranged immediately above it. The side walls of each container are provided with apertures or other suitable gripping sites adapted to be engaged from above by gripping means positioned over the container and between the extended side walls, thereby allowing containers to be removed from the hold compartment and yet be stacked close together therein, so that the maximum storage capacity of the hold compartment for containers may be utilized.

The rapid and efficient transfer of containers between storage positions in the hold compartment and working positions above the deck overlying the hold of the vessel is achieved by the use of an in-hold travelling hoist to move a plurality of containers to and from selected positions within the hold compartment in co-operation with an above-deck conveying system, including an above-deck hoist, operable to convey the plurality of containers between a position interior of the hold compartment directly below an open hatchway in the deck and a selected working position on the deck. Each hoist is provided with a vertically movable lifting frame having extendible projections adapted for engagement with or release from the gripping sites of a plurality of containers arranged end-to-end in a horizontal row, so that a row of containers may be thereby lifted from the next underlying row without disturbing the containers stacked in rows adjacent to the sides or bottom of the row being lifted.

Transporter assemblies which utilize the principle of horizontal movement of a lifting device on a track and of hoisting and lowering therefrom for the purpose of lifting cargo from within a hold of a ship to dockside and vice versa are known in the art of materials handling, as in U.S. Pat. No. 2,591,140 (Dougherty), U.S. Pat. No. 3,543,952 (Young), U.S. Pat. No. 3,630,390 (Tax), U.S. Pat. No. 3,881,608 (Hupkes) and U.S. Pat. No. 3,946,881 (Ludvigsen). Travelling crane assemblies which further provide for fore-and-aft motion of the entire lifting unit are also known for use with container ships, as in U.S. Pat. No. 2,456,104 (Andersen), U.S. Pat. No. 2,984,367 (McIntyre) and U.S. Pat. No. 4,049,132 (Stromback).

The apparatus described in U.S. patent application Ser. No. 513,418 differs from the prior art relating to marine transporter assemblies in disclosing a travelling hoist which operates beneath a deck of a fishing trawler at sea in co-operation with above-deck conveying apparatus in an efficient system for the transfer of containers suitable for the storage of fish between a working deck and selected locations in the hold.

Stackable, vertically interlocking packing or transport cases for the storage or transportation of fish in an ice-packed condition, which provide for outside drainage of melt water to prevent contamination of the contents of the lower container in a stack, are known. Examples of such containers are disclosed in U.S. Pat. No. 3,338,468 (Wilson), U.S. Pat. No. 3,366,273 (Crocella et al.) and U.S. Pat. No. 3,447,716 (Nesse). Cases of this type are not, however, provided with extended, slotted side walls to impart transverse strength to a stack of nesting containers while allowing for grasping and lifting of a container by a mechanism operating between the side walls. Interior gripping ability allows an array of such containers to be lifted without disturbing adjacent containers. In stackable containers according to the invention, the mating fit between the pair of extended, slotted side walls of one such container and the bottom longitudinal recesses of a container stacked immediately thereabove, the recesses being formed by the bottom of each container having a reduced width, a relatively large percentage of the volume occupied by the extended side walls of the container is recaptured in a stack of such containers to afford a higher volumetric efficiency than has been achieved with known nesting containers. The arrangement of mating elements in the stackable container according to the present invention permits the close packing of large, insulated (i.e. thick-walled) containers designed for mechanical handling, while at the same minimizing the effective loss of each container's storage capacity. A disadvantage of known containers, particularly of the relatively smaller fish boxes intended for manual handling, a decreased volumetric efficiency resulting from the space occupied in a stack of such containers by the inter-engaging locking elements on the container.

In a particular embodiment of the invention, the bottom of one container is free to move longitudinally relative to the top of a container stacked immediately therebelow, with the recessed portions of the bottom of the upper container translated along tps of the extended side walls of the lower container. This feature, allowing for one degree of freedom of movement in the planr the containers at the top of a stack, is particularly advantageous for use of a semi-mechanized handling system for such contain on a smaller vessel, permitting the coordinated use of manual sliding and mechanical lifting of containers when on deck for charging and discharging their contents. High stacking strength is achieved by exterior vertical corrugations in the side walls of the container, which is further rigidified by a stiffener rod fastened between the side walls. The stiffener rod also provides support for a cover that fits closely between the side walls and curves over the end walls of the container in a frictional fit.

SUMMARY OF THE INVENTION

Directed generally to the containerization and handling of fish on board an ocean-going vessel, the invention, in one aspect relates to a nesting container having a bottom wall, a pair of side walls extending upwardly from opposite sides of the bottom wall and a pair of end walls extending upwardly from opposite ends of the bottom wall, the container being configured and dimensioned at its top and bottom for mating engagement with the bottom and top, respectively, of similar vertically adjacent containers in a vertical stack. The side walls are provided with gripping sites in the vicinity of the upper portions thereof, adapted to be engaged by gripping means operating between the side walls, thereby allowing containers to be lifted without disturbing like containers stacked closely at the sides and ends of the container being lifted.

Another aspect of the invention is a nesting container for the storage of fish and ice within the hold of a fishing vessel, wherein the bottom portions of the side walls are inwardly recessed a sufficient amount that the bottom portion of such containers is of a reduced width dimensioned to be received between the extending upper portions of the side walls of a similar container stacked vertically therebelow. The vertical dimension of the bottom portion of the container of reduced width is slightly less than the vertical dimension of the upper portion of the side walls extending beyond the tops of the end walls. One of the vertical end walls has a drainage hole therethrough located immediately above the interior face of the bottom wall, to allow drainage of melting ice, and the container is further provided with an arrangement of parallel drainage grooves running vertically along the interior faces of the end walls and longitudinally along the interior face of the bottom wall to communicate with the drainage hole, so that liquid in the container flows along the drainage grooves and out the drainage hole.

Optionally, the recessed bottom portion of a container may be slidable relative to the tops of the extended wall portions of another such container stacked immediately therebelow, to peit one degree of freedom of movement in the horizontal plan thereby permitting a container to be moved longitudinally along the top of a row of such containers aligned end-to-end without requiring the vertical lifting of the upper container.

Applicant's related U.S. patent application Ser. No. 513,418 is directed to apparatus for use aboard a fishing vessel having a hold compartment provided with a hatchway through the main deck overlying the hold compartment, for transferring fish containers between storage positions in the hold compartment and at least one working position above the hold compartment. The apparatus comprises internal hoisting means disposed below the main deck of the hold compartment, operable to convey fish containers according to the present invention between a location directly below the hatchway and other storage positions within the hold compartment, and external conveying means disposed above the main deck of the hold compartment operable to convey the fish containers between a location within the hold compartment directly below the hatchway and at least one working position above the hold compartment.

The invention of applicant's related patent application is also directed to a system for the containerization and handling of fish aboard a fishing vessel having a main deck, at least one hold compartment beneath the main deck and a longitudinal hatchway through the main deck extending in length over substantially the full length of the hold compartment. The system comprises in combination a plurality of similar stackable fish containers, each provided with cover means and having matching opposed flanges extending upwardly at opposite sides of the cover means, and further having a bottom portion configured for nesting engagement with the top flanges of a similar container stacked therebelow, the flanges being further provided with opposed gripping sites adapted for engagement by gripping means positioned over the cover means and between the two opposed flanges, whereby the top container of a stack of containers may be vertically lifted from the stack without disturbing containers in adjacent stacks, hoisting means disposed below the main deck and operable to selectively grip and release containers at their gripping sites and to convey them between selected positions within the hold compartment, and conveying means disposed above the main deck operable to selectively grip and release containers and to convey them between a location within the hold compartment directly below the hatchway and at least one working position on the main deck of the fishing vessel.

The invention of the applicant which is the subject of U.S. application Ser. No. 513,418 is also directed to a system for the containerization and handling of fish aboard a fishing vessel having a main deck, at least one hold compartment beneath the main deck and a longitudinal hatchway through the main deck extending in length over substantially the full length of the hold compartment, which comprises in combination, a plurality of similar stackable fish containers provided with cover means and matching flanges extending upwardly from each such container at opposite sides of the cover means, each such container being provided with opposed gripping sites adapted for engagement by gripping means positioned over the cover means between the two opposed flanges, the containers being configured and dimensioned for vertical mating engagement in a predetermined array of vertical stacks in close lateral contact within the hold compartment, each layer of any such vertical stacks comprising a predetermined number of such stackable containers in a longitudinal row, first hoisting means disposed below the main deck, operable to grip a single longitudinal row of containers positioned within the hold compartment, to raise or lower the row of containers and to transport the row of containers between selected positions within the hold compartment, the first hoisting means including a first horizontal framework mounted for travel within the hold compartment adjacent the underside of the main deck between opposed sides of the hold compartment, a first lifting frame operatively connected to and vertically movable with respect to the first horizontal framework and adapted to be elevated into close proximity therewith, the first lifting frame being dimensioned for placement between the opposed side flanges of a longitudinal row of containers, and gripping means mounted to the first lifting frame and operable to selectively engage and release the gripping sites of the containers in the longitudinal row, an array of vertical guide members transversely spaced along each end of the hold compartment and adapted to prevent undesired horizontal movement of the rows of containers, while permitting vertical movement of the rows of containers and permitting horizontal movement of the rows of containers when said rows have been raised to a location proximate the underside of the deck, and conveying means disposed above the main deck and operable to selectively grip and release a single longitudinal row of containers and to convey that row between a location within the hold compartment directly below the hatchway and at least one working position on the main deck of the fishing vessel.

These and other features of the invention are described hereinafter in the detailed description of embodiments of the invention taken in conjunction with the drawings.

BRIEF DESCRIPTION OF THE DRAWINGS

In the drawings which illustrate embodiments of the invention,

FIG. 6 is a top plan view of the travelling framework of an in-hold transverse travelling hoist mounted for travel along transverse beams affixed to the underside of the working deck of a fish hold compartment.

FIG. 7 is a side elevation view of the travelling framework of FIG. 6 seen along the section VII—VII showing the lifting frame suspended from the travelling framework.

DESCRIPTION OF PARTICULAR EMBODIMENT

Figure 1:
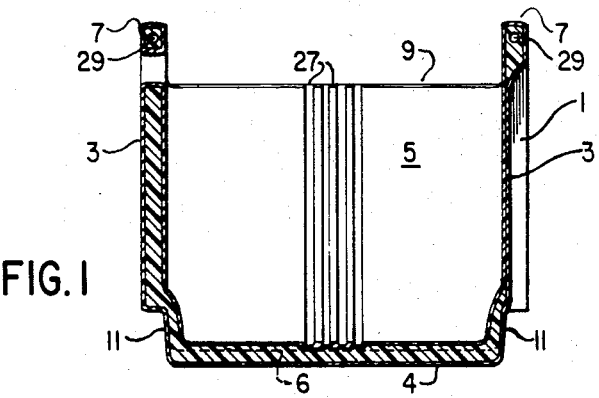
FIG. 1 is an end elevational sectional view of a fish container for use in the containerization system of the present invention.
Figure 2:
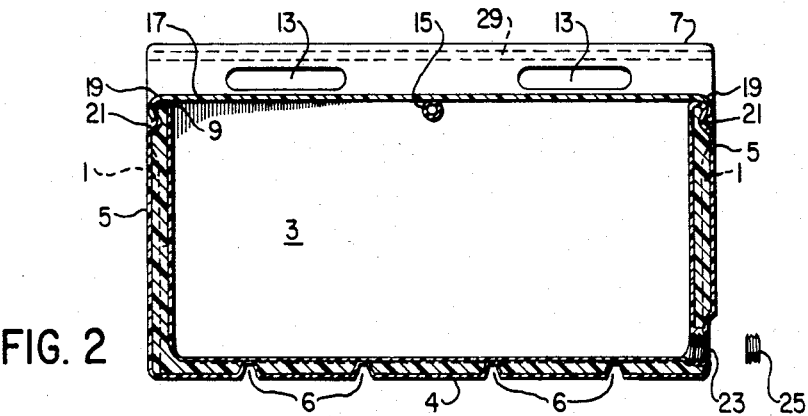
FIG. 2 is a side elevational sectional view of the container of FIG. 1, including a snap-on cover and horizontal grooves in the end walls for securing the cover.

A nesting container according to the present invention for use in the storage and handling of fish on a fishing trawler using the container handling method and apparatus of U.S. application Ser. No. 513,418 is illustrated in FIGS. 1 to 3.

Such a container is preferably of double-wall construction and fabricated of high density polyethylene or other high strength material suitable for contact with foodstuffs. Polyurethane insulation may be foamed into place within the double walls during fabrication to further rigidify the structure and to reduce the melting of ice packed with fish into the container.

Figure 3:
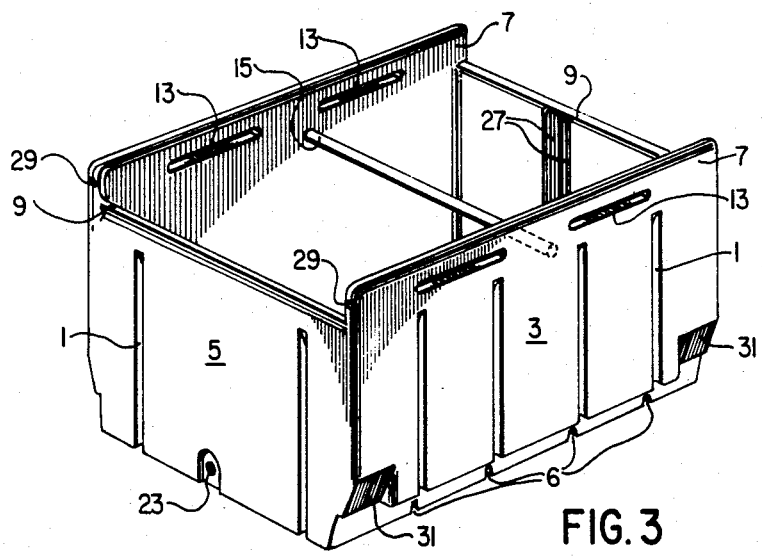
FIG. 3 is a perspective view from above and to one side of the container of FIG. 1, without a cover.

The vertical stacking strength of the containers is enhanced by the inclusion of a series of exterior vertical corrugations 1 formed in side walls 3 and end walls 5, as best seen in FIG. 3. Bottom wall 4 is strengthened by a series of exterior horizontal corrugations 6, seen in cross-section in FIG. 2.

The upper portions 7 of the side walls 3 extend vertically beyond the tops 9 of the end walls 5. The bottom portions 11 of the side walls 3 are inwardly recessed a sufficient amount that the bottom portion of the container is of a reduced width dimensioned to be received between the extending upper portions 7 of the side wall 3 of a similar container container stacked vertically therebelow.

Preferably, the vertical dimension of the bottom portion of the container of reduced width is slightly less than the vertical dimension of the upper portions 7 of the side walls 3 extending beyond the tops 9 of said end walls 5 to allow for the thickness of container covers, described below, in the stacking of containers one above the other. However, the aforementioned vertical dimension should be no less than is necessary to permit the undersides of the side walls of a container to abut against the upper portions 7 of the corresponding side walls of a container stacked immediately therebelow, so that the volumetric efficiency of stacking is maximized. One disadvantage of prior known stackable containers arises from the fact that the wall portions having hand holes or other gripping sites take up undue space. With stackable containers having the configuration depicted in FIGS. 1–3, a large percentage of the volume occupied by the gripping sites is regained in the vertically overlapping nesting of such containers in a stack. For ease of nesting and separation of containers stacked one above the other, the recessed bottom portions 11 of the side walls 3 are preferably sloped slightly outwardly from the bottom as seen in FIG. 1.

As will be apparent from FIGS. 1 and 3, in a vertical column of containers according to the invention, the uppermost container is free to be moved in a direction parallel to walls 3 without the exertion appreciable of force against the walls of the container immediately below it in the stack.

Through each of side wall upper portions 7 there is a pair of longitudinal slots 13 opposed to a corresponding pair of slots in the opposite side wall portion. As will be described in more detail below with reference to the hoisting systems of the present invention, these slots through extended side wall portions impart to a container the ability to be lifted from the top of a stack of such containers without disturbing like adjacent containers disposed below, to either side or to either end of the container being lifted.

Added strength along the parallel side wall portions extending above the upper edges of the end walls is achieved by the inclusion of an elongate stiffening member 15 fastened at opposed locations on the interior surfaces of the side walls so that the top surface of member 15 lies in a horizontal plane with the upper edges 9 of the end walls of the container. Member 15 is preferably a polyethylene pipe cross member welded at each end to opposite locations on the interior faces of side walls 3. Each container is provided with a cover 17 dimensioned for close fit between the extended portions 7 of the parallel side walls. As best seen in FIG. 2, the cover is supported at its ends by the upper edges of the end walls, and centrally by the stiffening member. Cover 17 is provided with end tabs 19, which turn down over the end walls of the container in a snap fit in horizontal grooves 21 in the exterior faces of end walls 5. Cover 17 may simply be a sheet of high density polyethylene of sufficient thickness and strength to retain the contents of fish and ice during rolling motion of the trawler at sea. The cover also serves to prevent contamination of the contents of a container.

Mechanized System and Method for Using the Container of the Invention in the Containerization and Handling of Fish Aboard a Fishing Vessel FIGS. 4–19 and the following description relate to apparatus and methods which are the subject of applicant's co-pending U.S. patent application Ser. No. 513,418 entitled "Containerization System, Apparatus and Method", and illustrate how the container of FIGS. 1-3 may advantageously and efficiently be used in fishing and storage operations on a sea-going vessel.

Each container is provided with a drainage hole 23 through one of the end walls 5 to allow water formed by the melting of ice within a container to drain along the outside of the end walls of containers stacked below. The bore of hole 23 is screw-threaded to allow insertion of a threaded drainage plug 25. Melt water within a container is internally drained towards drainage hole 23 along an arrangement of parallel drainage grooves 27 running vertically along the interior faces of end walls 5 and longitudinally along the interior face of bottom wall 4 to communicate with drainage hole 23.

Figure 5A:
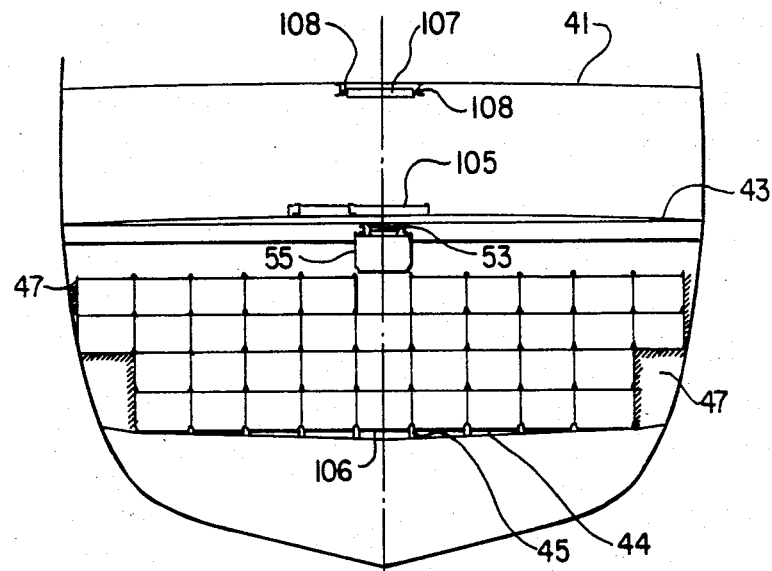
FIGS. 5a to 5d are cross-sectional views through a hold compartment along the line V—V of FIG. 4, showing the disposition of containers at various stages of the handling operation and further showing the cooperating hoist systems.
Figure 5B:
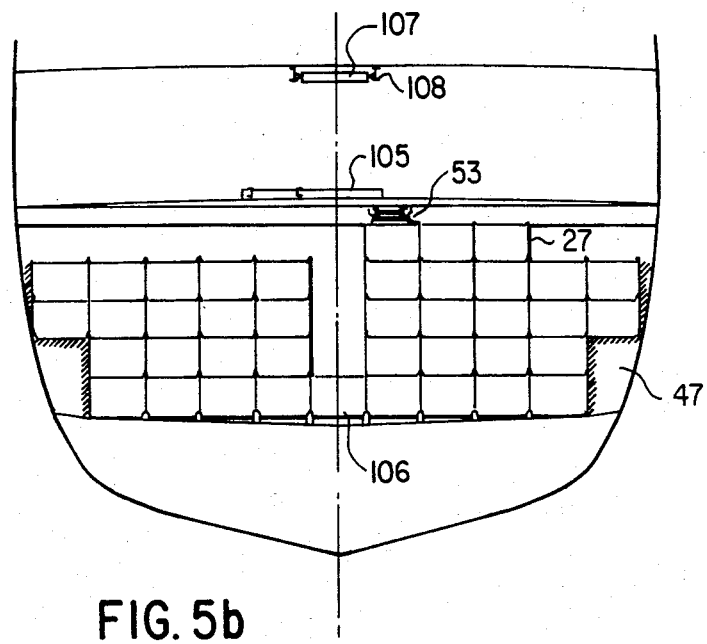
Figure 5C:
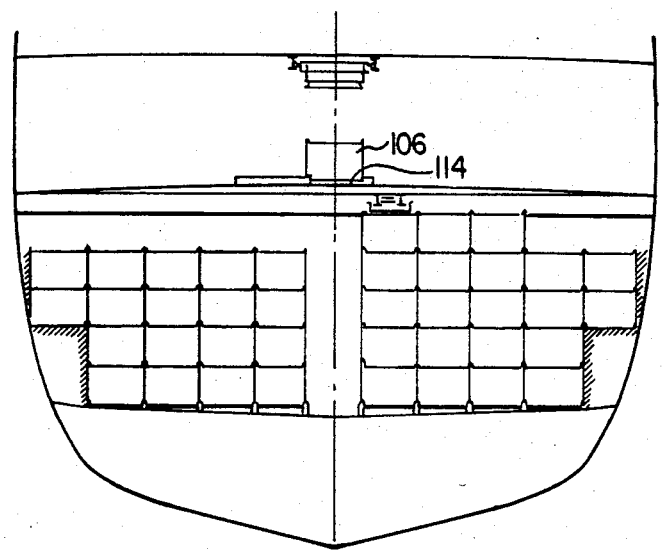

As shown in FIG. 5c, at various times during the operation of the system, as hereinafter described in detail, there will be empty space between two vertical stacks of containers. The end containers of each row are retained against undesired lateral movement by engagement with vertical T-section members, also hereinafter described in detail. To prevent dislodgement by motion of the ship of the interior containers of a row adjacent to the vacated space, at least the containers constituting each row of the second layer from the top of a hold compartment are secured together by removable connecting means which may be released when such a row of containers is placed on deck for loading with fish and ice. The connecting means used may comprise channel connectors adapted to be snapped over adjacent extended side wall portions of containers within the longitudinal row, or a removable dowel rod inserted through a longitudinal channel extending through matching openings in the extended side wall portions of the containers in the row, or any other convenient connecting means. In FIG. 1, side wall portions 9 are shown as provided with longitudinal holes 29, to accommodate securing dowel rods.

To facilitate the entry of the container between the T-section members described below when the container is being lowered into position, the side walls 3 of the container are preferably provided with tapered guide portions 31, as best seen in FIG. 3.

Figure 4:
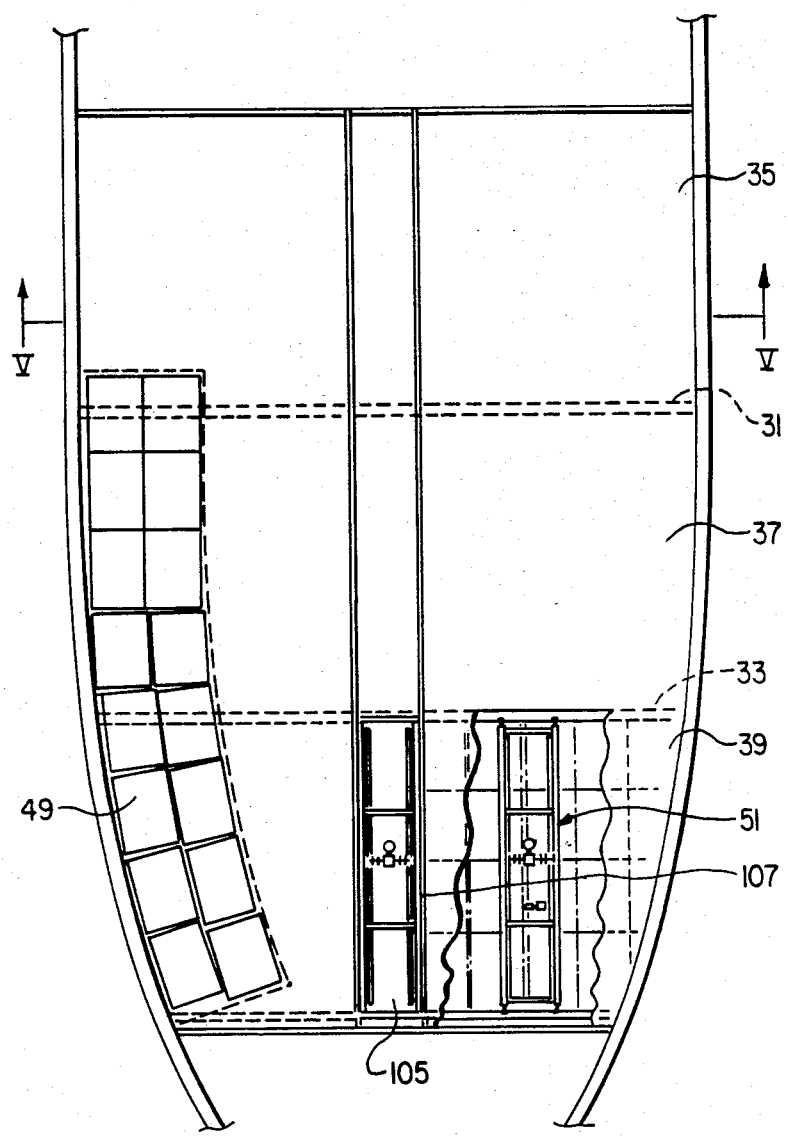
FIG. 4 is a top plan view, partly broken away, of the factory deck of a fishing trawler equipped with a containerization system for use with stackable containers according to the present invention.

In accordance with the present invention, a trawler fish hold is divided across its length into a plurality of fish hold compartments (three or four, depending on the overall length of the hold). As shown in FIG. 4, partitions 31 and 33 divide the hold into compartments 35, 37 and 39, of which 35 is the largest owing to curvature of the hull of the vessel.

A cross-sectional view across hold compartment 35 is shown in FIG. 5a, illustrating the upper deck 41 which lies spaced above the main or factory deck 43. A plurality of identical nesting containers is shown stacked within hold compartment 35. Containers stacked within a hold compartment are arranged in longitudinal rows each containing a predetermined number of containers that depends upon the relative length of the hold compartment and a container.

As seen in FIG. 5a, the layer of containers stacked nearest the bottom 44 of the hold compartment is supported at a uniform height by suitably placed framing 45. Containers nearest the sides of the hold compartment are kept in position by side supports 47 which prevent their falling over or being dislodged toward the curved sides of the vessel.

As will be described in more detail below, according to the working of the present invention, the largest hold compartment is not entirely filled with containers when the trawler leaves port. Rather, as seen in FIG. 4, the topmost layer of containers for that hold compartment is stored above the deck of the vessel in a container storage system 49, which is preferably located above the working decks of the smaller hold compartments disposed toward the fore of the vessel. The vacant top layer space over the remaining containers within the largest hold compartment enables the temporary storage of all the rows of containers from any vertical stack, within this top layer space, preparatory to their removal to the above-deck charging area. In the preferred embodiment, the number of rows which can be accommodated across the top layer is sufficiently great relative to the number of rows comprising any vertical stack to permit storage of all the rows of the vertical stack in the vacant top layer space below and to one side of the hatchway.

For the moving and placement of containers located beneath the factory deck, each hold compartment is provided with internal hoisting means disposed below the factory deck and operable to convey fish containers between a location directly below the hatchway and other storage positions within the hold compartment. In the preferred embodiment, the internal hoisting means is a transverse travelling hoist. In FIG. 4, the transverse travelling hoist associated with hold compartment 39 is indicated at 51. The transverse travelling hoist associated with hold compartment 35 is indicated at 53 in FIG. 5a, engaging and suspending a longitudinal row of containers 55.

The structure of in-hold transverse travelling hoist 53 is shown in detail in FIGS. 6 to 13. As best seen in FIGS. 6 to 10, hoist 53 comprises a rectangular travelling framework 56, having four idle rollers 57 mounted at its four corners for travel along a pair of transverse tracks 58 affixed to the underside of working deck 43 along opposite ends of hold compartment 35.

Framework 56 carries two similar motor and gear reducer combinations 59 each operatively connected to a circular toothed pinion 61 which engages the teeth of corresponding rack section 63. Rack sections 63 are affixed to opposite transverse tracks 58.

Motion of framework 56 along tracks 58 in either transverse direction, and its placement at a selected lateral position along the underside of the working deck, may be effected by actuating, stopping or reversing the motor/reduction gear combinations 59.

Transverse travelling hoist 53 also comprises a rectangular lifting frame 65, shown in side elevational view in FIG. 7, suspended below travelling framework 56.

Lifting frame 65 is adapted to engage a longitudinal row of containers running the length of a hold compartment. Vertical travel of frame 65 is effected by means of a four-drum winch 69 mounted on transverse travelling framework 56 and powered by a third motor/reduction gear combination 71 centrally mounted on framework 56. The rotation of winch 69 extends or retracts cables 73 which are looped over four pulleys 75 disposed towards the four corners of framework 55 and attached by any convenient means to corresponding corners of lifting frame 65, as shown at 77 in FIG. 7. When cables 73 are retracted so that lifting frame 65 is at its maximum elevation, lateral oscillations of frame 65 are prevented by the abutting proximity of frame 65 to travelling framework 56.

Figure 11:
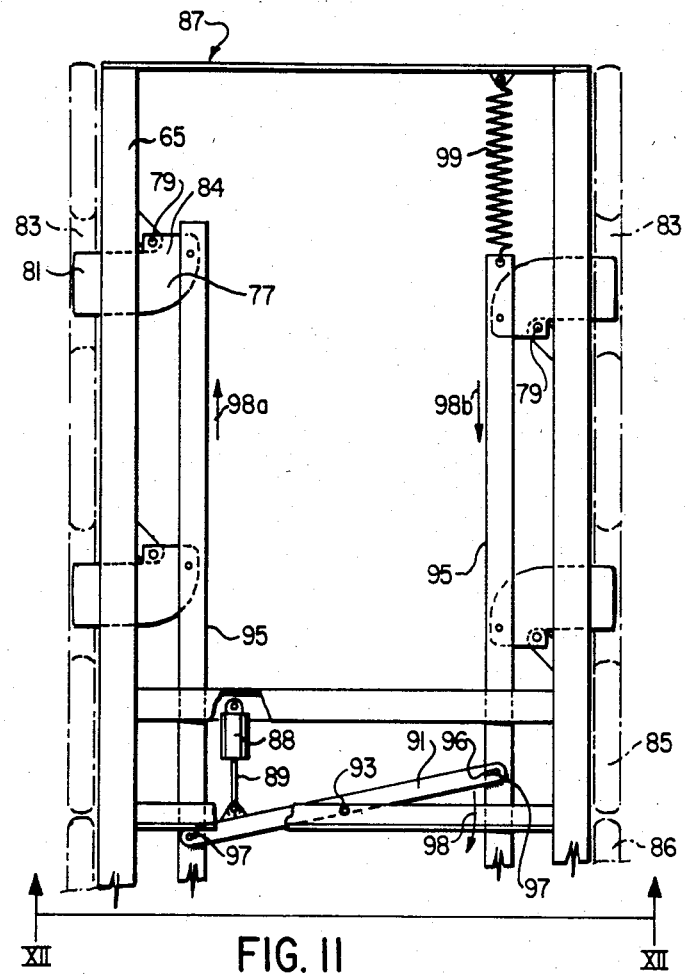
FIG. 11 is an enlarged fragmentary view of a lifting frame such as that associated with either the in-hold transverse travelling hoist of FIG. 7 or the above-deck longitudinal travelling hoist of FIG. 16.
Figure 12:
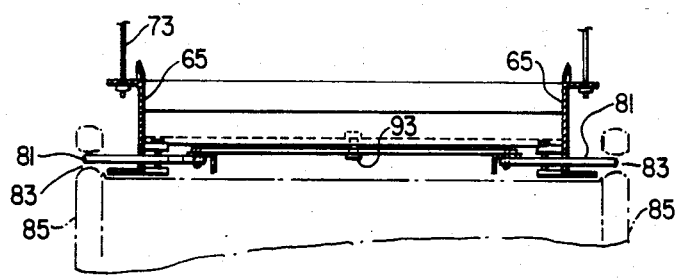
FIG. 12 is a cross-sectional view along the section XII—XII through the lifting frame of FIG. 11.

Details of the container pick-up means with which lifting frame 65 is provided are shown in FIGS. 11 and 12. Lifting frame 65 includes opposed pairs of container-engaging lugs projecting from members 77 pivotally mounted on pins 79 along the long sides of frame 65. Each lug presents a container engaging portion 81 which projects outwardly beyond the long side of frame 65 at one extreme of the pivotal movement of the member 77, to permit engagement with a matching slot 83 through the side wall of a container. In FIG. 12, the container-engaging lugs are shown in the engaged position.

Each lug-carrying member 77 comprises a lever portion 84 extending towards the interior of lifting frame 65. By exertion of a longitudinal force against lever portions 84, it may be seen that the container-engaging lugs can be extended to engage, or retracted to disengage with slots 83 in the containers 85 and 86. The two pairs of matching opposed lugs nearest end 87 of lifting frame 65 in FIG. 11, correspond to the four slots through the extended side walls of a single container 85. Container 86 next adjacent the end of container 85 in the longitudinal row of containers is likewise engaged through its four slots by the next four lugs, etc.

Only the linkages involved in engaging the first container in a longitudinal row are completely shown, as the pattern of lugs and the manner in which they are linked repeats over the length of lifting frame 65. The length of the frame and hence the number of quartets of lugs positioned to engage a single container will depend upon the length of the particular hold compartment and the number of containers placed end-to-end in a longitudinal row accommodated by that hold compartment.

The simultaneous engagement or disengagement of all the lugs from the row of containers between whose extended side walls lifting frame 65 is positioned is effected by the action of a pneumatic cylinder 88 and piston 89 combination powered by an air compressor and air receiver unit (not shown) carried on frame 65. Piston 89 is pivotally linked to cross member 91 which is adapted to pivot about a centrally located pin 93 in response to longitudinal movement of piston 89. All container-engaging lugs along either side of frame 65 are constrained to move in unison by pivotal connections of the lever portions 84 of the associated members with a longitudinal coupling member 95 linked to pivoting cross member 91 at opposite ends thereof by pins 97. Pins 97 are situated within slots 96 in the ends of pivoting member 91, thereby allowing for the slight transverse movement of cross member 91.

As viewed in FIG. 11, retraction of piston 89 causes cross member 91 to move in the sense indicated by arrow 98, thereby moving coupling members 95 in opposite longitudinal directions, as indicated by arrows 98a and 98b, and moving the container-engaging lugs to the retracted (disengaged) position. Extension of piston 89 causes the lugs to extend and engage slots 83 in container 85.

A spring 99 connects coupling member 95 to the end 87 of frame 65 to exert a biasing force on the lugs toward the engaged position. In the event of an accidental loss of power to air cylinder 88 when lifting frame 65 is carrying a row of containers, spring 99 maintains the lugs in the engaged position and the undesired release of the containers is averted.

Figure 13:
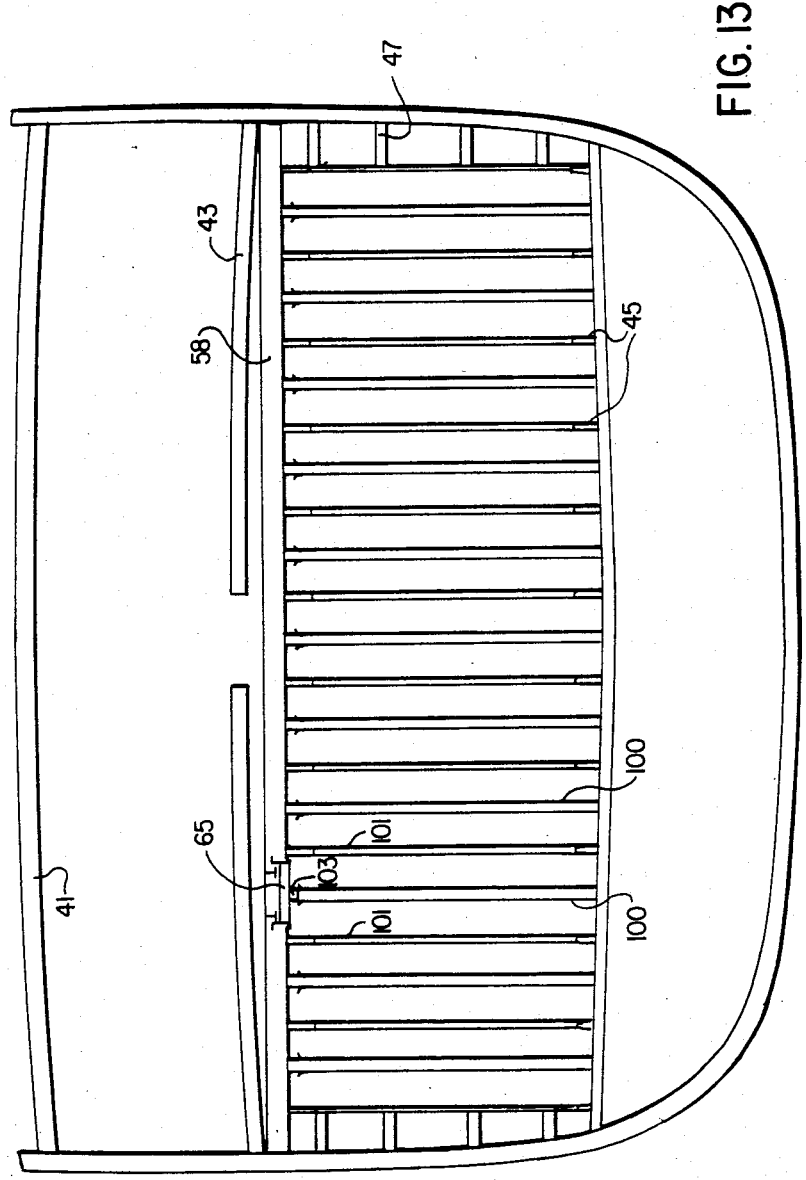
FIG. 13 is a transverse vertical sectional view of a typical hold compartment empty of containers.
Figure 14:
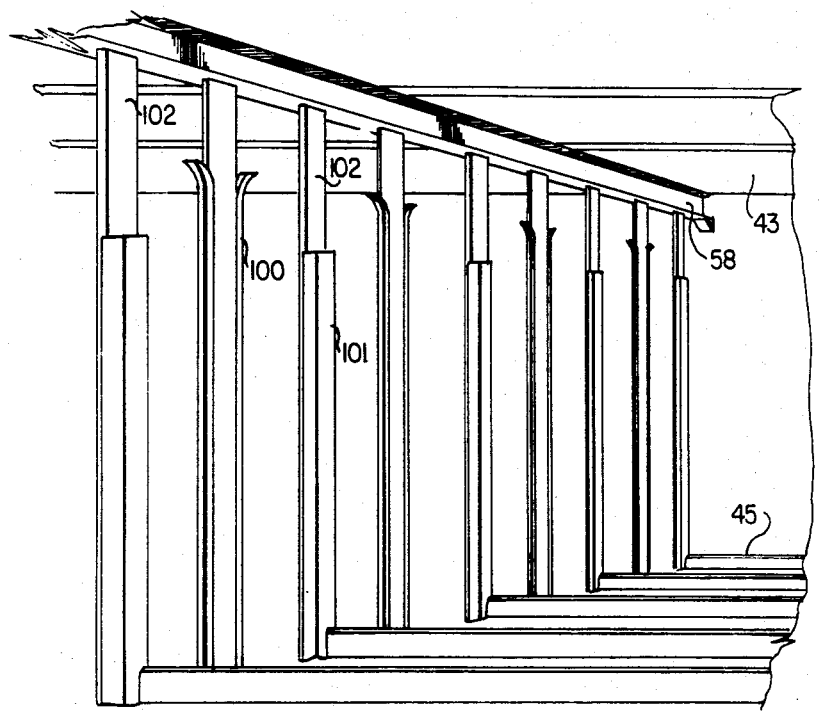
FIG. 14 is a partial perspective view of the hold compartment of FIG. 13, showing the vertical guide members located along one end of the hold compartment and a transverse beam for supporting the travelling framework of FIG. 6.

The removal of containers from and their replacement into a hold compartment of a fishing trawler at sea requires restraint devices within the hold to ensure that containers will not be thrown into unfilled spaces or damaged by lateral swinging of the suspended lifting frame on the in-hold travelling hoist in the event of rolling of the vessel. As seen in FIGS. 13 and 14, the partition between adjacent hold compartments comprises an arrangement of parallel guides and supports extending from the bottom of the hold up to the main beam beneath the factory deck. FIGS. 13 and 14 provide a sectional view and a perspective view, respectively, of a typical hold compartment, empty of containers so that the alternating set of vertical channel guides 100 and T-section members 101 may be seen. A hold compartment is bounded at its front and back ends by two such sets of opposed channel guides and T-section members. As may best be seen in FIG. 14, each channel guide 100 and each T-section member 101 is associated with a flat vertical partition portion 102 extending from the floor 44 of the hold compartment upwardly to meet the transverse track 58 mounted against the underside of main deck 43.

Figure 15:
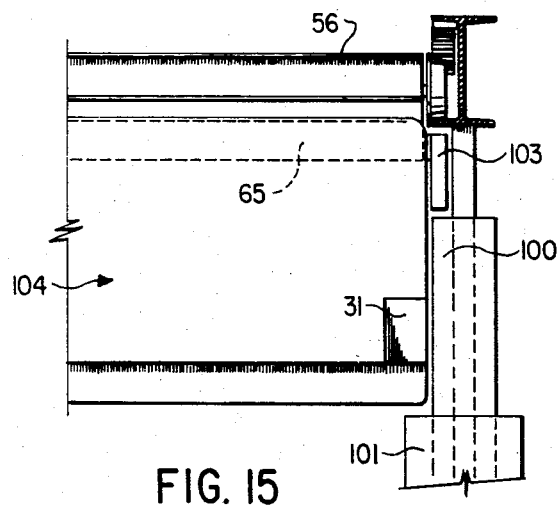
FIG. 15 is a fragmentary side elevational view of an in-hold transverse travelling hoist with lifting frame engaging a container at the top extent of its vertical travel within a hold compartment.

As shown in FIGS. 14 and 15, the vertical extent of the channel guides 100 and T-sections 101 is such that lifting frame 65 is restricted to vertical movement, except when raised to the top extent of its travel, by the engagement of projecting members 103, centrally located at either end of lifting frame 65, within the vertical channel of channel end guide 100. When raised to the top limit of its travel, lifting frame 65 is in close proximity to the travelling framework 56, and so restrained against lateral oscillation with respect to travelling framework 56.

As may be seen from FIG. 15, container 104, a container at the end of a longitudinal row of containers engaged by lifting frame 65, is itself restrained from transverse movement when positioned below its highest point of vertical travel within the hold by the two vertical T-section guides 101 located at either side of container 104.

In ordinary use in the container-handling method of the present invention, a below-deck transverse travelling hoist is moved across a hold compartment only when the lifting frame 65 is drawn up against transverse travelling frame 56. In this retracted position the row of containers engaged by the lifting frame and the lifting frame itself are clear of the lateral restraints presented by the vertical channel guide and T-section members, but are stabilized by proximity to the travelling frame and the transverse tracks along which it moves. Whenever the lifting frame is lowered vertically into the hold, however, accidental lateral swinging movement of the frame and engaged containers is prevented by the arrangement of vertical guides described above.

As seen in FIGS. 4 and 5a, each hold compartment presents a longitudinal hatchway 105 through working deck 43 overlying the hold compartment. Hatchway 105 is centrally disposed over the predetermined storage location of one vertical stack of containers 106, so that the uppermost longitudinal row of containers of stack 106 may be vertically lifted from the interior of the hold compartment through hatchway 105 to a position directly above the hatchway.

Conveying means external to the hold compartment are operable to convey fish containers between a location within the hold compartment directly below the hatchway and at least one working position on the main deck of the hold compartment. In one embodiment of the invention, the above-deck components of the container handling apparatus of the present invention, which effect the raising and lowering of a longitudinal row of containers positioned within a hold compartment directly below the hatchway of that hold compartment and the transportation of the row of containers to and from selected locations on the working deck, include a longitudinal travelling hoist.

As seen in FIG. 5a, longitudinal travelling hoist 107 is mounted next to the underside of upper deck 43 on parallel longitudinal tracks 108 straddling hatchway 105.

Figure 16:
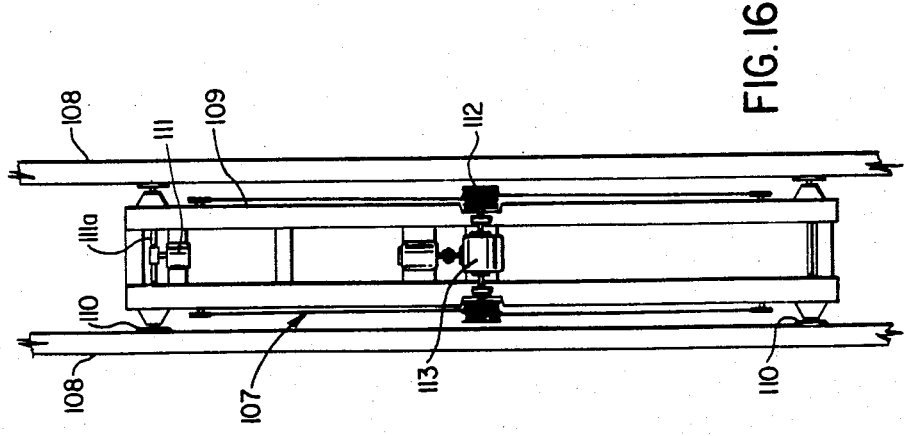
FIG. 16 is a top plan view of the travelling framework of the above-deck longitudinal travelling hoist mounted for travel along longitudinal tracks affixed to the underside of the upper deck of a fishing trawler.

An enlarged top plan view of above-deck longitudinal travelling hoist 107 is shown in FIG. 16. Travelling hoist 107 includes a rectangular travelling framework 109. having four idle rollers 110 mounted at its four corners for travel along tracks 108. Travelling framework 109 is powered to move along tracks 108 by means such as a motor drive and reduction gear combination 111, the drive shaft 111a of which is linked at its ends to rack-and-pinion drive mechanisms similar to that of transverse travelling framework 56, described above.

Longitudinal travelling hoist 107 also includes a rectangular lifting frame and gripping means of like construction to rectangular lifting frame 65, described in connection with FIG. 11. Vertical travel of the lifting frame associated with longitudinal travelling hoist 107 is effected by means of a four-drum winch 112 mounted on longitudinal travelling framework 109 and powered by a motor/reduction gear combination 113, in a manner similar to the lifting mechanism described in relation to the below-deck transverse travelling hoist described above.

Travelling hoist 107 may be positioned over the hatchway of each successive hold compartment to move a longitudinal row of containers therefrom or to deposit a row of containers vertically into the hold compartment directly below the hatchway, whence it may be engaged and transported laterally to selected positions within the hold by the in-hold transverse travelling hoist 53.

Figure 17:
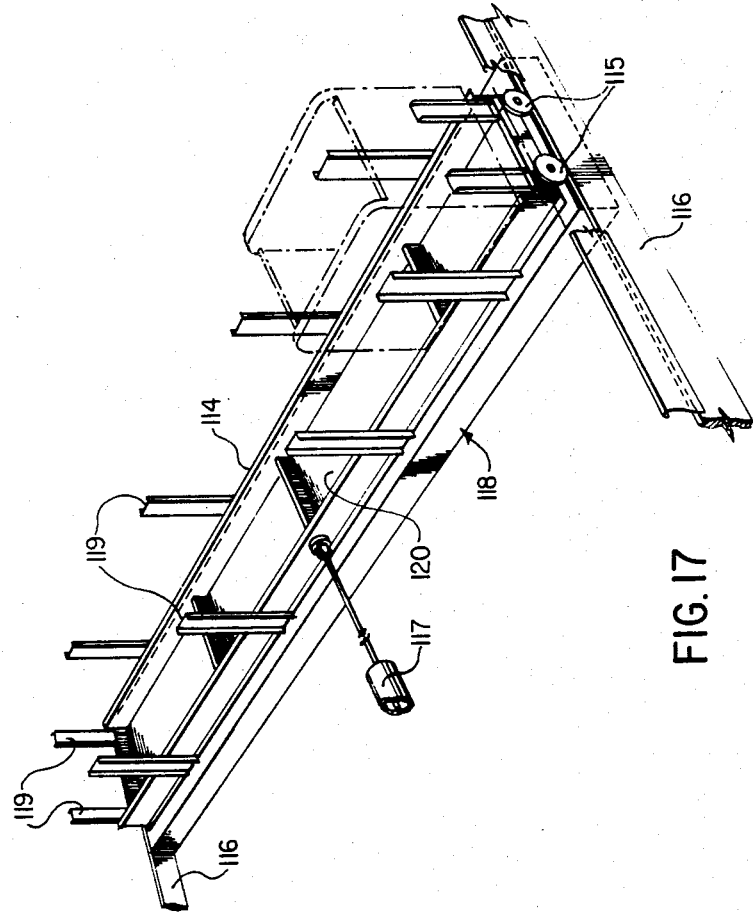
FIG. 17 is a perspective view of a transverse moving framework mounted on the factory deck in the vicinity of the hatchway through the deck.

At least one hold compartment is provided with travelling support means, operable to convey containers between a location above the main deck directly over the hatchway and a working position to one side of the hatchway. In one embodiment, the placement on the working area of the factory deck of a row of containers is effected by providing at least one hold compartment with an above-deck transverse moving frame unit 114 which acts in co-operation with above-deck longitudinal travelling hoist 107. As shown in FIG. 17, transverse moving frame 114 is provided at its four corners with rollers 115 mounted for movement along parallel transverse segments 116, whereby frame 114 may be positioned by suitable drive means such as hydraulic drive 117 for lateral positioning of the framework directly over hatchway 105 or displaced from hatchway 105 toward a separate container storage and fish loading area on the factory deck. In FIG. 17, frame 114 is shown positioned over the hatch coaming 118 defining the opening of hatchway 105. Frame 114 is provided around its periphery with spaced vertical members 119 to guide containers into the frame and to provide lateral support.

When a row of containers has been lifted from within a hold compartment by travelling hoist 107, transverse moving frame 114 may be positioned over hatchway 105 directly beneath the row of containers held by the above-deck travelling hoist. The containers may then be lowered into frame 114 onto supporting platform portion 120, in the position shown in broken lines in FIG. 17, for transverse movement into position for filling with fish and ice. By reversing this operation, a row of containers so filled may be replaced into the hold compartment.

Alternatively, a row of containers lifted from within a hold compartment and lowered into frame 114 positioned directly over hatchway 105 may be filled with fish and ice while held in frame 114 directly over hatchway 105, platform 120 of frame 114 serving as both a loading station and as a temporary cover over hatchway 105 to prevent fish and ice from falling into hold compartment 105. The operation of a fishing trawler provided with this embodiment of hoisting apparatus and containers used in the trawler containerization system of the present invention will now be described.

A trawler will leave port with each hold compartment but the largest (or, one of the largest, if there is more than one hold compartment of maximum size) filled to capacity with containers stacked in longitudinal rows as described above. The remaining compartment is partially filled, space to accommodate a complete layer of containers being left vacant at the top of the compartment. As shown in FIG. 4, a number of containers corresponding to the capacity of the vacant top layer next below the factory deck in the partially-filled hold compartment are kept above the factory deck in container storage system 49 prior to the commencement of fishing operations. The containers so stored are the last to be charged with fish and ice.

A predetermined proportion of the containers placed within the hold compartments and the factory deck storage system in readiness for fishing operations is filled with ice for use in the packing of all containers with fish and ice. The ratio of ice-filled to empty containers will depend upon the anticipated requirements for the catch. In the following description it will be assumed for simplicity that the length of each horizontal row of containers within the hold is four containers and that a single container full of ice is sufficient to ice four containers of fish. In that event, each longitudinal row will consist of three empty containers and one filled with ice.

When fishing commences, the in-hold travelling hoist 53 of the largest hold compartment is positioned over the vertical stack of containers located directly below hatchway 105. The lifting device is lowered and as shown in FIG. 5a, the top row 55 of four containers is engaged and raised sufficiently to clear adjacent rows of containers and the restraints of the vertical channel guides and T-section members. In this position, sizeable oscillations of the containers held by the travelling hoist owing to vessel movement are prevented by contact with the travelling framework.

The top row of the central vertical stack is deposited by the in-hold travelling hoist on a vertical stack to the side of the hold compartment, and successive rows are similarly raised and positioned to the side, until the bottom row 106 of the central vertical stack is uncovered, as shown in FIG. 5b.

The uncovered bottom row of containers 106 below the hatchway is then engaged by the lifting frame of the above-deck travelling hoist and is raised out of the hold compartment to its maximum elevation, whereupon the deck-mounted transverse moving frame is positioned over the hatch directly below the raised row of containers. This row of containers is then lowered on to the transverse moving frame 114, as shown in FIG. 5c. The transverse moving frame may then be returned with the one ice-filled and three empty containers to its original position on the factory deck adjacent and parallel to the hatchway.

Alternatively, transverse moving frame 114 may serve to hold a row of containers over hatchway 105 for filling with fish and ice, rather than transporting the containers to a working area laterally displaced from the hatchway. Vertical end and side restraints 119 around frame 114 serve as support for the containers, and the framework itself serves as a cover over hatchway 105 to prevent fish and ice from accidentally falling into the hold.

The covers of the four containers are removed, the ice-filled container is overturned by suitable dumping apparatus and the contents charged into an ice hopper screw feeder unit. The container emptied of its ice is returned to its position in the horizontal row of containers on the travelling framework and all four containers are charged with fish and ice either simultaneously or in succession, the ice feeder unit being operated to feed the correct proportion of ice into each container.

Figure 5D:
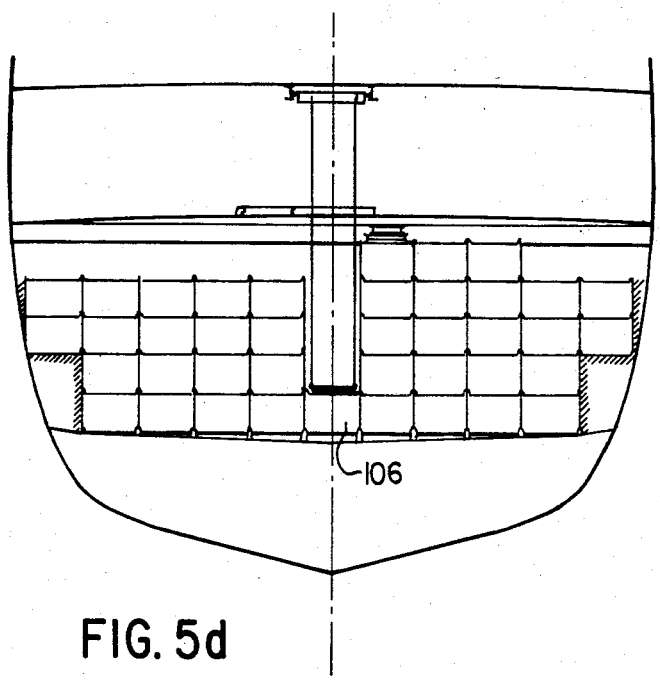
Figure 8:
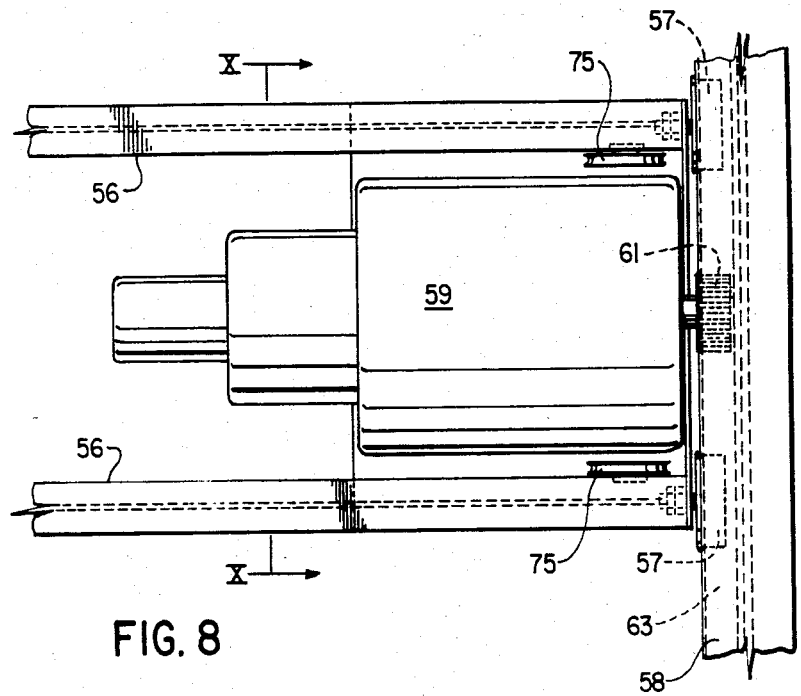
FIG. 8 is an enlarged partial top plan view of the travelling framework of FIG. 6 showing in dotted outline the mechanism of engagement of one end pair of framework rollers with the corresponding transverse track.
Figure 9:
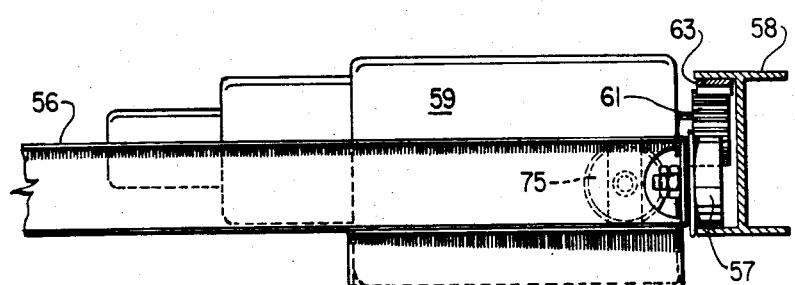
FIG. 9 is a side elevation view of the portion of the travelling framework shown in FIG. 8.
Figure 10:
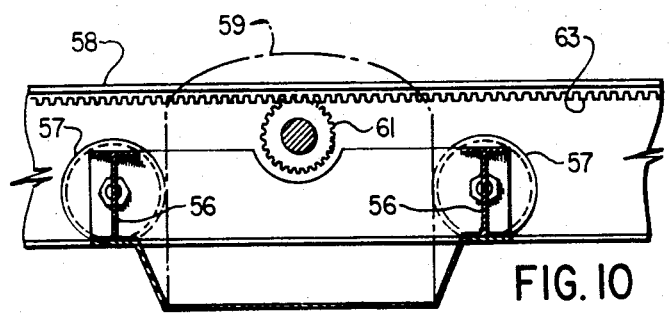
FIG. 10 is an end elevational view of FIG. 8 along the section X—X, partly broken away to reveal the mechanism of engagement of one end pair of framework rollers with the corresponding transverse track.

Alternatively, ice may be manually distributed among the four containers of a row in a working position as follows: As fish are loaded into two of the three empty containers, ice from the initially ice-filled container is shovelled into each of them. When those two containers have been charged with fish and ice, the originally ice-filled container is manually moved from its position sufficiently to insert a "floating" empty container, which is charged with fish and ice along with the remaining container. The now-empty, originally ice-filled container then serves as the "floating" container for the next set of four. When all four containers have been charged, the covers are replaced and the travelling framework positioned over the hatchway (if not already there). The containers are then engaged by the longitudinal travelling hoist and raised sufficiently to permit retraction of the transverse travelling framework. The row of containers 106 is then lowered through the hatchway to its original position at the bottom of the hold compartment, as shown in FIG. 5d.

The next row of containers which had been placed in the top level of the hold compartment away from the hatchway is then transferred by the in-hold travelling hoist to a position directly beneath the hatchway and is lowered and deposited on to the first row of containers filled. The in-hold travelling hoist is then withdrawn and the row of containers is removed, charged with fish and ice and replaced in its original position, second from the bottom of the central vertical stack, in like manner as the bottom row of containers.

This operation is repeated until each row of the central vertical stack has been returned to its original position after being filled with ice and fish.

A second vertical stack of containers is then transferred row by row to adjacent temporary storage positions in the top layer space of the hold to one side of the hatchway. The stack of filled containers directly below the hatch then serves as a working platform to the top of which each temporarily stored row of containers from the second vertical stack is transferred by the in-hold travelling hoist for removal to the charging area by the above-deck hoisting system. After charging with fish and ice, a row of containers is placed back on the top of the central stack of filled containers and thence deposited in its original position in the second vertical stack by the in-hold travelling hoist.

The operations carried out on the second vertical stack of containers are then repeated for each of the remaining stacks within the hold. That is, all remaining containers in the first hold compartment are similarly successively transferred by the in-hold hoist system to a position directly below the hatchway, where they are picked up by the above-deck hoisting system, deposited in the transverse moving frame, charged with fish and ice and returned to the hold to the same positions they occupied prior to removal.

When all containers in the first hold have thus been filled with fish and ice, the above-deck travelling hoist is moved longitudinally along the underside of the upper deck and positioned over the second hold compartment. The top layer of containers in this hold compartment is removed row-by-row, filled with fish and ice and placed within the empty upper level of the first hold compartment. Loading of the second hold compartment then proceeds in the manner described above with reference to FIGS. 5a to 5d for the first hold compartment.

In like manner, loading of containers proceeds from hold compartment to hold compartment until all the remaining rows of containers which were originally stored in the hold have been removed, filled with fish and ice, and replaced. Those containers which were originally stored in the on-deck storage system are next moved, either manually or by means of a suitable overhead track and trolley system (not shown) into place on the transverse moving frame associated with the working deck of a hold compartment and are charged with fish and ice in the manner described above. Successive loaded rows from the above deck storage system are then used in loading the remaining empty spaces of the last compartment, whereupon the trawler returns to port with all hold compartments filled.

In the operation described above, it is necessary to have a transverse-moving frame on the working deck at only one of the compartment hatchways and to conduct container filling operations in the vicinity of that hatchway alone. The longitudinally moving above-deck hoist then serves to transfer a row of containers raised from within any of the hold compartments to a position over the hatchway of the one working deck. By using a longitudinally-travelling above-deck hoist to transfer a row of containers between its below-deck storage position and a working position on a platform positioned either directly over or to one side of the hatchway of the largest hold compartment (which is ordinarily located towards the stern of the ship and nearer the actual fishing operations than the other hold compartments), while at the same time locating the on-deck container storage area over the other hold compartments, more deck space is provided above the deck of the largest hold compartment for ice-feeding equipment, and the length of conventional fish conveyor is minimized.

Figure 18A:
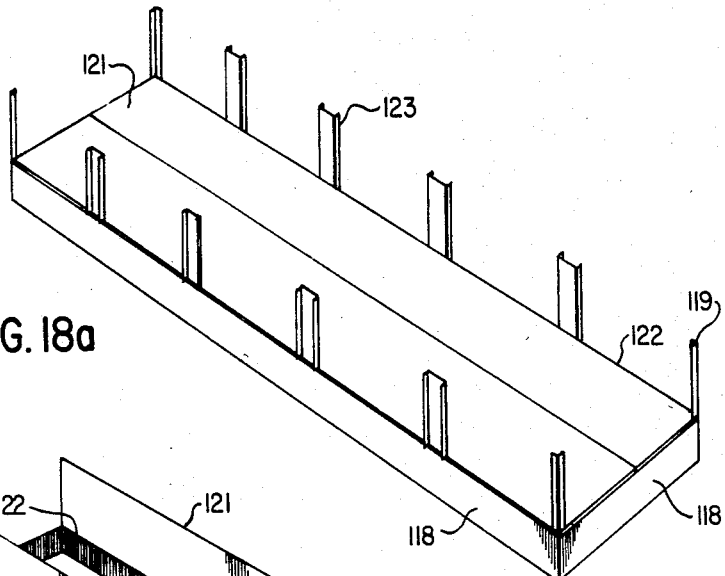
FIG. 18a is a perspective view of an outwardly opening hinged hatch cover with vertically extending container side restraints which may be used as an alternative to the transverse moving framework of FIG. 17.
Figure 18B:
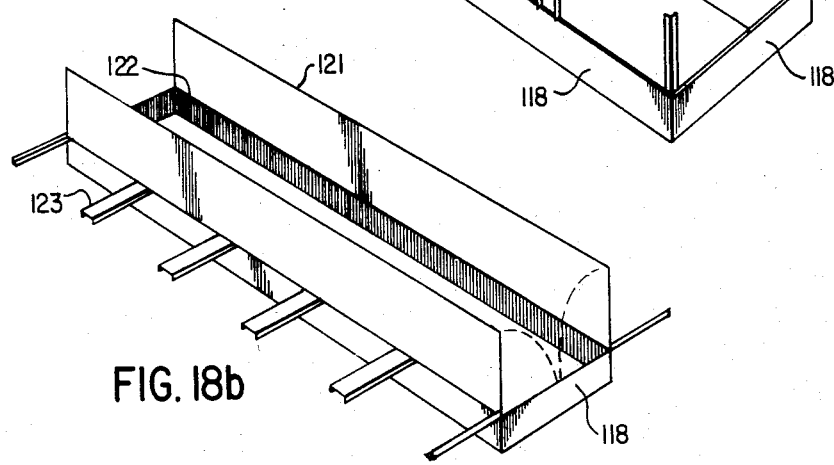
FIG. 18b is a perspective view of the hatch cover of FIG. 18a showing the hatch cover in the open position.

In an alternative embodiment of the invention, illustrated in FIGS. 18a and 18b, the transverse moving frame of FIG. 17 may be omitted and each hold compartment provided with a hatch cover hingedly mounted to the coaming 118 of the hatchway 105 through the overlying deck for swinging open to allow the passage of a row of containers, as shown in FIG. 18b. In the closed position shown in FIG. 18a, hinged hatch covers 121 fold down along hinged sections 122 to provide a working station for the loading of fish and ice into a row of containers in the manner described above. Peripheral upstanding support members 123 are designed to hold a row of containers securely over the closed hatch cover and to extend horizontally outwardly from the hatch coaming 118 when the hatch cover is open. For use with this alternative embodiment, the single longitudinal travelling hoist of FIG. 16 may be replaced by a series of fixed vertical hoists located above the hatchway cover of each hold compartment, whereby filling of containers is carried out at work stations above each hatchway. This embodiment permits all hold compartments to be operated simultaneously during the discharge and filling operations in port, thereby increasing the rate at which those operations can be performed.

Figure 19:
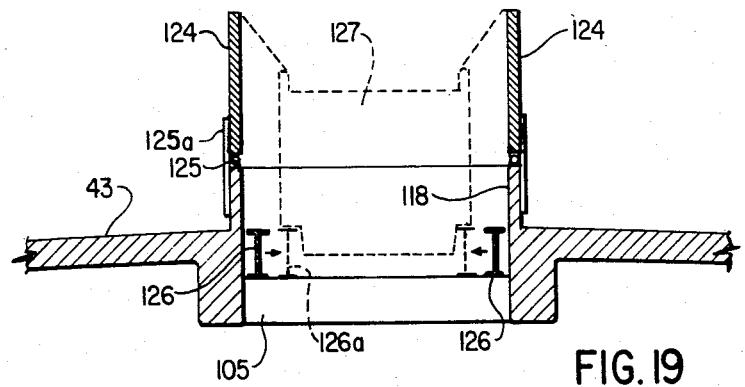
FIG. 19 is a cross sectional view through the factory deck of an outwardly opening hinged hatch cover and movable container support means which may be used as an alternative to the transverse moving framework of FIG. 17.

In a further alternative embodiment illustrated in FIG. 19, the transverse moving frame of FIG. 17 may again be omitted and each hold compartment provided with movable container support means located within each hatchway at the level of the factory deck. In the transverse cross-sectional view through factory deck 43 in the vicinity of hatchway 105, shown in FIG. 19, the hatch cover comprises first and second cover portions 124 pivotally mounted to opposed long sides of hatch coaming 118 along the top outer edges thereof as indicated at 125, for swinging movement away from hatchway 105 to a substantially vertical open position; swinging movement beyond this open position is prevented by members 125a which extend vertically above and below pivot 125. Hinged cover portions 124 may be swung from their substantially vertical open position toward the top surface of hatch coaming 118 to a substantially horizontal closed position resting against the top surface of hatch coaming 118 and substantially occluding hatchway 105.

Parallel longitudinal support beams 126 are joined to movable supports at each end of the hold compartment. The support beams 126 are operable to be selectively moved between an open configuration 126, which permits containers to pass through hatchway 105, and a closed configuration 126a, shown in dotted outline, in which the support beams are positioned to support a row of containers 127, shown in dotted outline, in hatchway 105 within the perimeter of hatch coaming 118, by engagement of the recessed portion of the bottom of containers 127.

In the operation of a system incorporating the embodiment of FIG. 19, a row of containers which has been hoisted above hatchway 105 may be lowered and supported at the factory deck level within the perimeter of coaming 118 by beams positioned at 126a. The lifting lugs of the lifting frame of the above deck hoist are then disengaged, whereupon the covers of the containers 127 may be removed and the containers charged with fish and ice. Immediately prior to the charging of containers held within the hatchway at factory deck level in this manner, auxiliary covers 128 may be put into position to prevent fish and ice from falling into the hold through hatchway 105 during the charging operation.

Turning finally to the discharge of containers filled with fish and ice when the fishing vessel returns to port, it is readily seen that this may be achieved by the combined use of the in-hold travelling hoist to place a row of containers laterally displaced from the hatchway on top of that row of containers immediately below the hatchway, whence the on-deck hoist removes that row for placement on deck and subsequent removal from the vessel. Thus, as was the case in respect of the filling operations described above, the vertical stack of containers below the hatchway serves as a working platform during discharge as well. To maintain vessel stability, rows of containers will be removed alternately from opposite sides of the vessel.

Removal of containers from the deck of the vessel may be achieved by any suitable conventional means, such as a cargo winch, a conveyor system, a shore-mounted hoist, etc. Maximum rate of discharge will probably best be achieved through the use of a suitably designed conveyor system operating through the side of the vessel to the factory deck area near the hold hatches.

While particular embodiments have been described and shown with reference specifically to fishing trawler containerization, it is to be understood that these embodiments are illustrative only, and that the present invention is not limited thereto, but includes all embodiments falling within the scope and spirit of the appended claims.

I claim:

1. A stackable container, comprising:
   (i) a rectangular bottom wall;
   (ii) a pair of end walls extending upwardly from the opposed short sides of said bottom wall;
   (iii) a pair of side walls extending upwardly from the opposed long sides of said bottom wall and having vertically extending upper portions at a displacement above the tops of said end walls, the bottom portions of said side walls being inwardly recessed a sufficient amount that each of said containers at the bottom thereof presents a portion having a reduced width dimensioned to be received between the extending upper portions of the side walls of a similar container stacked vertically therebelow, said portion of reduced width being of a vertical dimension substantially equal to the vertical dimension of the extended upper portions of said side walls;
   (iv) a laminar cover dimensioned to fit closely between said upper portions of said side walls, said end walls being provided near the tops thereof, and said cover being provided at the ends thereof with mating elements for removably securing said cover in an engaged position in a horizontal plane at the top of said end walls to enclose the interior of said container; and
   (v) a rigid stiffener rod extending transversely between and rigidly secured to opposed locations on the interior faces of said side walls generally midway between said end walls, the vertical level of said opposed locations being determined by said engaged position of said cover so that in said engaged position said cover is supported below by the upper surface of said stiffener rod,
   said side walls being provided with gripping sites in the vertically extending upper portions thereof adapted to be engaged by overhead mechanical gripping means operating between said upper portions of said side walls and above said cover in its engaged position, so that a container at the top of a stack may be removed without disturbing the contents of said container or similar containers stacked below or adjacent thereto.

2. A stackable container as defined in claim 1, wherein said gripping sites are opposed longitudinal slots located in said upwardly extending portions of said side walls at a uniform vertical distance above the tops of said end walls.

3. A stackable container as defined in claim 2 for the storage of fish and ice within the hold of a fishing vessel, wherein said side walls and said end walls are double walls each formed by two spaced partitions, and are provided with a plurality of vertically extending corrugations spaced along said walls, each said corrugation being formed during the fabrication of said container by the compression of a narrow vertical section of material of the outer partition of a wall inwardly to contact the inner partition of said wall, and wherein the spaces between said partitions of each wall contain thermal insulating material.

4. A container as defined in claim 3, wherein matching openings through the end faces of one of said side walls communicate with a longitudinal channel extending through said side wall parallel to and above said longitudinal slots through said side wall, so that a plurality of containers placed end to end may be temporarily secured by the insertion of a rigid removable rod into aligned longitudinal channels of said containers.

5. A stackable container as defined in claim 1, claim 3 or claim 4, wherein the portion presented by each of said containers at the bottom thereof having a reduced width, and dimensioned to be received between the extending upper portions of the side walls of a similar container stacked vertically therebelow, is longitudinally slidable relative to said extending upper portions of the side walls of the lower container.

6. A stackable container as defined in claim 1, claim 3 or claim 4, wherein inwardly and downwardly slanted portions are provided on each side of the container at each end of the container, immediately above the bottom portion of the container of reduced width.

* * * * *